United States Patent
Farjon et al.

(10) Patent No.: US 12,208,880 B2
(45) Date of Patent: Jan. 28, 2025

(54) ACQUISITION AND ANALYSIS DEVICE INTENDED FOR INTEGRATION INTO A PRE-EXISTING AIRCRAFT

(71) Applicant: SAFRAN ELECTRONICS & DEFENSE, Paris (FR)

(72) Inventors: Julien Farjon, Paris (FR); Nicolas Cadalen, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 671 days.

(21) Appl. No.: 17/416,310

(22) PCT Filed: Dec. 19, 2019

(86) PCT No.: PCT/EP2019/086269
§ 371 (c)(1),
(2) Date: Jun. 18, 2021

(87) PCT Pub. No.: WO2020/127702
PCT Pub. Date: Jun. 25, 2020

(65) Prior Publication Data
US 2022/0073189 A1  Mar. 10, 2022

(30) Foreign Application Priority Data

Dec. 19, 2018 (FR) .................................. 1873405
Feb. 6, 2019 (FR) .................................. 1901190
Feb. 6, 2019 (FR) .................................. 1901191

(51) Int. Cl.
*B64C 13/18* (2006.01)
*B64C 13/22* (2006.01)
(Continued)

(52) U.S. Cl.
CPC .............. *B64C 13/18* (2013.01); *B64C 13/22* (2013.01); *B64C 13/503* (2013.01);
(Continued)

(58) Field of Classification Search
CPC ........ B64C 13/18; B64C 13/22; B64C 13/503; G05D 1/0061; G05D 1/106
See application file for complete search history.

(56) References Cited

U.S. PATENT DOCUMENTS

| 4,622,667 A | * | 11/1986 | Yount | ..................... G06F 11/16 |
| | | | | 714/E11.054 |
| 10,040,574 B1 | * | 8/2018 | Laske, Jr. | .......... B64D 45/0031 |

(Continued)

FOREIGN PATENT DOCUMENTS

| EP | 1450227 A2 | 8/2004 |
| EP | 3121121 A1 | 1/2017 |
| GB | 2381879 A | 5/2003 |

OTHER PUBLICATIONS

Barbara Peterson, "Two People in a Cockpit Isn't Enough: What We Need to Prevent Future Air Disasters" Apr. 1, 2015 (Apr. 1, 2015). Retrieved from the Internet: https://www.popularmechanics.com/flighUal4871/ger_manwings-flight-9525-cockpit-safety-rules/ [retrieved on Nov. 8, 2019] p. 2-p. 3.

(Continued)

*Primary Examiner* — Dale Moyer
(74) *Attorney, Agent, or Firm* — MUNCY, GEISSLER, OLDS & LOWE, P.C.

(57) ABSTRACT

An acquisition and analysis device to be integrated in a pre-existing aircraft that includes original systems comprising pilot controls and also an autopilot system includes acquisition means arranged to acquire parameters produced by the original systems, and analysis means arranged on the basis of the parameters, to evaluate whether the pre-existing aircraft is normal or abnormal, and to evaluate the current stage of flight of the pre-existing aircraft, on the basis of the state of the pre-existing aircraft and of the current stage of flight of the pre-existing aircraft, to define a piloting setpoint selected from piloting setpoints comprising at least a manual (Continued)

piloting setpoint produced by a pilot actuating pilot controls, an autopilot setpoint produced by the autopilot system, and an alternative piloting setpoint, and to cause the selected piloting setpoint to be transmitted to the original systems of the pre-existing aircraft.

8 Claims, 7 Drawing Sheets

(51) Int. Cl.
*B64C 13/50* (2006.01)
*G05D 1/00* (2006.01)
*G05D 1/606* (2024.01)
*G05D 1/81* (2024.01)

(52) U.S. Cl.
CPC ........... *G05D 1/0061* (2013.01); *G05D 1/106* (2019.05); *G05D 1/606* (2024.01); *G05D 1/81* (2024.01)

(56) References Cited

U.S. PATENT DOCUMENTS

| | | | |
|---|---|---|---|
| 2003/0130770 A1* | 7/2003 | Matos | B64D 45/0031 701/3 |
| 2004/0162670 A1* | 8/2004 | Brown | B64D 45/0015 701/110 |
| 2006/0032978 A1* | 2/2006 | Matos | B64D 45/0059 244/118.5 |
| 2007/0029449 A1* | 2/2007 | Matos | G05D 1/0061 244/195 |
| 2009/0105891 A1* | 4/2009 | Jones | B64D 45/0031 701/2 |
| 2018/0290729 A1 | 10/2018 | Shavit | |
| 2018/0295638 A1* | 10/2018 | Sullivan | H04W 72/569 |

OTHER PUBLICATIONS

Yixiang Lim et al. "Commercial airline single-pilot operations: System design and 1-8 pathways to certification" IEEE Aerospace and Electronic Systems Magazine., US, vol. 32, No. 7, Jul. 1, 2017 (Jul. 1, 2017), pp. 4-21.

* cited by examiner

ACQUISITION AND ANALYSIS DEVICE INTENDED FOR INTEGRATION INTO A PRE-EXISTING AIRCRAFT

The invention relates to the field of acquisition and analysis devices for integrating in pre-existing aircraft.

BACKGROUND OF THE INVENTION

Modern airliners are generally piloted by a crew of at least two pilots comprising a captain and a co-pilot.

Plans are being made to fly certain such airliners with only one pilot for very specific applications, and in particular for transporting cargo. Plans are thus being made to convert an Airbus A321 type airliner into a cargo plane suitable for being piloted by a single pilot.

Reconfiguring an airliner in this way presents numerous advantages.

By transforming a pre-existing airliner that has been flying for several years into a cargo plane, a time-tested and reliable cargo plane is obtained without any need to finance an entire new airplane development program. Furthermore, the financial return on the initial program is improved by means of this new application.

Since a cargo plane does not transport passengers, unlike an airliner, reducing the number of pilots would appear to be an initial step that the general public can accept more easily. Naturally, there is no question of accepting any reduction in flight safety, which should not be degraded, but which should on the contrary, be improved by this re-configuration.

By reducing the number of pilots, the overall cost of each flight is naturally also reduced.

Furthermore, various solutions have emerged that serve to assist a pilot in performing piloting tasks, potentially improving safety by being able to analyze a large quantity of data in real time.

Nevertheless, reconfiguring an airliner in this way also encounters various difficulties.

The current architecture of numerous transport airplanes is specifically based on the assumption of a crew that has two pilots. A two-pilot crew serves to mitigate the failure of one of the pilots during critical stages of flight.

Furthermore, conventional autopilot systems do not cover all stages of flight. During certain stages of flight, the airplane needs to be controlled manually by a pilot. Thus, with only one pilot, a failure of the pilot during such a stage of flight can lead to a catastrophic event that is the result of a single outage, which is not acceptable.

Reducing the number of pilots thus makes it necessary to develop various additional safety functions and to integrate them in the airplane.

These additional safety functions relate in particular to ensuring that the airplane continues to be piloted completely safely even in the event of a failure of the autopilot system or in the event of the sole pilot being incapable of piloting the airplane manually. The additional safety functions must also serve to prevent, or at least to limit, the consequences of a malicious act undertaken by the pilot, such as for example deliberately crashing the airplane into infrastructure or populated areas.

Naturally, for the conversion of a pre-existing airliner into a cargo plane to be advantageous from an economic point of view, these additional safety functions must be integrated in pre-existing airplanes while requiring only limited additional certification activity.

OBJECT OF THE INVENTION

An object of the invention is to convert a conventional pre-existing airplane in reliable and inexpensive manner into an airplane that can be piloted by a single pilot.

SUMMARY OF THE INVENTION

In order to achieve this object, there is provided an acquisition and analysis device arranged to be integrated in a pre-existing aircraft that includes original systems comprising both pilot controls suitable for being actuated by a pilot of the pre-existing aircraft and also an autopilot system, the acquisition and analysis device comprising acquisition means arranged to acquire parameters produced by the original systems of the pre-existing aircraft, and analysis means arranged:

on the basis of the parameters, to evaluate whether the pre-existing aircraft is in a state that is normal or abnormal, and to evaluate the current stage of flight of the pre-existing aircraft;

on the basis of the state of the pre-existing aircraft and of the current stage of flight of the pre-existing aircraft, to define a piloting setpoint selected from among a plurality of piloting setpoints comprising at least a manual piloting setpoint produced by the pilot actuating the pilot controls, an autopilot setpoint produced by the autopilot system, and an alternative piloting setpoint; and to cause the selected piloting setpoint to be transmitted to the original systems of the pre-existing aircraft so that the original systems are controlled using the selected piloting setpoint.

The acquisition and analysis device of the invention is thus for integrating in a pre-existing aircraft.

The acquisition and analysis device acquires parameters and, by using these parameters, it evaluates whether conditions are satisfied for piloting the aircraft by using an alternative piloting setpoint that is different both from the manual piloting setpoint produced by the pilot and also from the autopilot setpoint. If such conditions are satisfied, the acquisition and analysis device causes the alternative piloting setpoint to be transmitted to the original systems in order to pilot the aircraft. The acquisition and analysis device activates use of the alternative piloting setpoint.

Thus, in the event of failure of the pilot or of the autopilot system, the alternative piloting setpoint can be used for piloting the aircraft. It is thus safe for the aircraft to be piloted by a single pilot.

The acquisition and analysis device can be integrated in the pre-existing aircraft without modifying the original systems. There is thus no need for the original systems to be subjected once again to certification, thereby reducing the cost of integration. Furthermore, the proposed principle of integration relies on the principle of segregating the new functions via a high-integrity interface device.

There is also provided an aircraft including an acquisition and analysis device as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
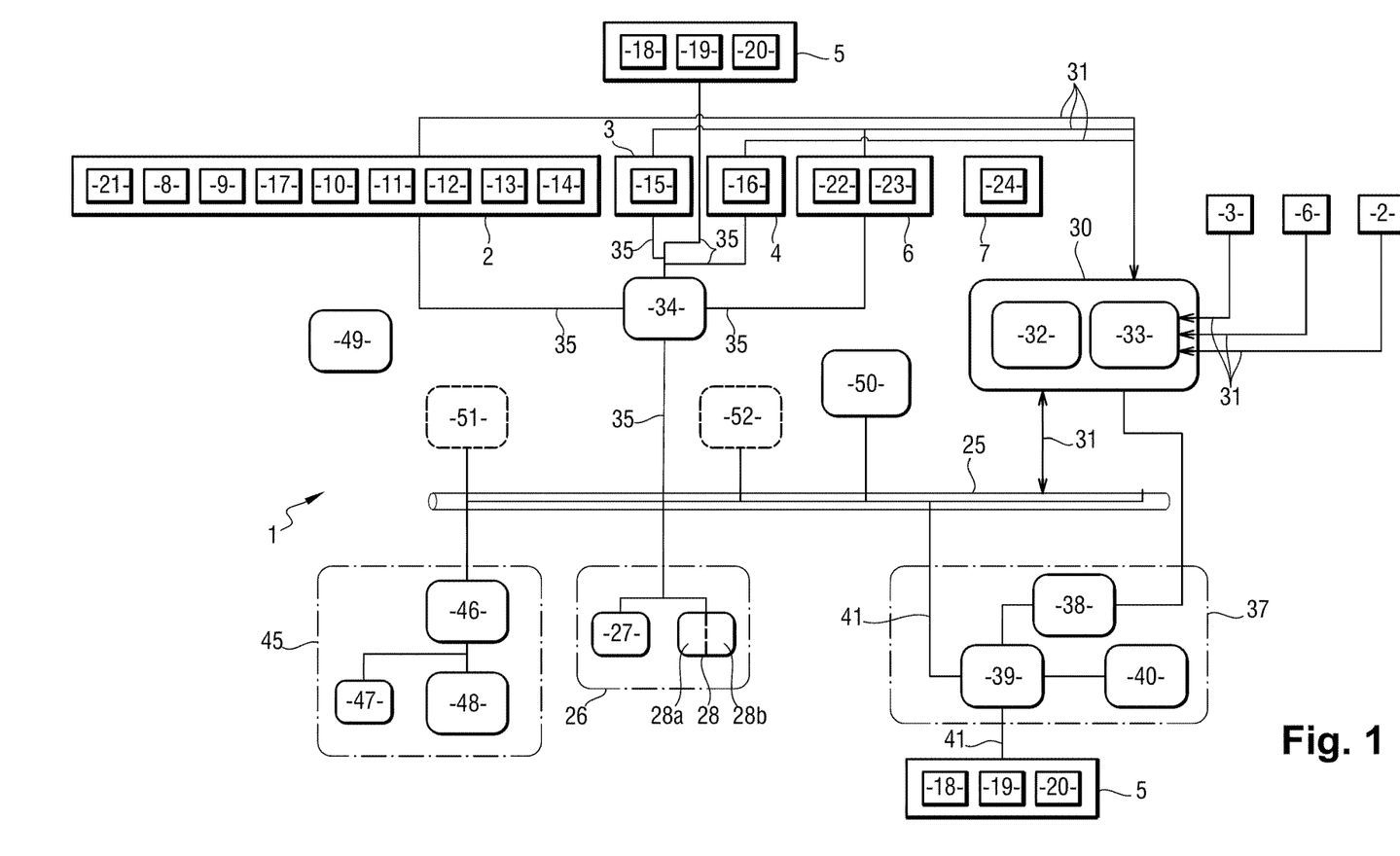
FIG. 1 shows an alternative piloting system, together with a plurality of original systems of a pre-existing aircraft.

With reference to FIG. 1, an alternative piloting system 1 is for integrating in a pre-existing aircraft. The term "pre-existing aircraft" is used to mean that, when the aircraft was designed, no provision was made for the aircraft to be fitted with the alternative piloting system 1. In other words, at the time it was designed, the aircraft did not include specific interfaces for integrating the alternative piloting system.

The aircraft is an airliner that is to be converted into a cargo plane suitable for being piloted by a single pilot. The alternative piloting system 1 is integrated in the airplane so as to enable it to be piloted by that single pilot while still complying with the safety and security requirements that are applicable to a conventional cargo plane piloted by a plurality of pilots.

The airplane includes a certain number of original systems, i.e. systems that were present at the time the airplane was designed.

These original systems include a flight control system 2, a landing gear system 3, a lighting system 4, a communication system 5, an autopilot system 6, and a navigation system 7. The landing gear system 3 includes a system for steering at least one undercarriage of the landing gear system, enabling the airplane to be steered when it moves on the ground, and also a braking system.

The original systems naturally include systems other than those mentioned above.

All of the original systems comprise equipment that is potentially provided with redundancy, and possibly in triplicate.

The flight control system 2 comprises pilot controls that are positioned in the cockpit and that are suitable for being actuated by the pilot, and it includes a throttle control lever 21, pedals 8, a trim control wheel 9, and control sticks 17 of the side-stick unit (SSU) type.

The flight control system 2 further comprises flight control computers including one or more elevator aileron computers (ELACs) 10, one or more spoiler elevator computers (SECs) 11, one or more forward air controllers (FACs) 12, one or more slat flap control computers (SFCCs) 13, and one or more trimmable horizontal stabilizer (THS) computers 14.

The undercarriage system 3 includes a braking and steering control unit (BSCU) 15.

The lighting system 4 includes landing lights 16 and light control means.

The communication system 5 includes communication means 18 in the very high frequency (VHF) band, communication means 19 in the high-frequency (HF) band, and satellite communication (SATCOM) means 20.

The autopilot system 6 includes one or more flight management guidance computers (FMGCs) 22 and one or more full authority digital engine control (FADEC) computers 23.

The navigation system 7 includes an air data inertial reference system (ADIRS) 24.

The alternative piloting system 1 co-operates with these original systems and with the original avionics, but it is completely separate and distinct from those original systems and from the original avionics.

The term "distinct" is used to mean that the alternative piloting system 1 has no equipment in common with the original systems or with the original avionics.

The separation is mechanical, and also separation in terms of software and of hardware. Thus, a failure or an outage of the alternative piloting system 1 (e.g. caused by hacking) has no significant impact on the original systems or on the original avionics.

The alternative piloting system 1 has a plurality of devices and a main bus 25, which in this example is an ARINC 664 data bus, suitable for conveying commands and data.

The various devices of the alternative piloting system 1 communicate with one another via the main bus 25. All of the devices of the alternative piloting system 1 are provided with appropriate protection means (firewall, antivirus, etc.) serving to make such communication secure.

The devices of the alternative piloting system 1 comprise firstly a piloting device 26. The piloting device 26 is connected solely to the main bus 25. The piloting device 26 is thus totally independent of the original systems of the airplane. The piloting device 26 is connected solely to an interface device 34 that is described below, and it is thus almost completely self-contained.

The piloting device 26 comprises a positioning unit 27 and a control unit 28 or "flight stability system" (FSS).

The positioning unit 27 comprises an inertial measurement unit, a satellite positioning device (or global navigation satellite system (GNSS)) having one or more antennas, and an air data computer.

The positioning unit 27 produces positioning data concerning the airplane. The positioning data comprises both location data and orientation data for the airplane.

The positioning unit 27 is independent and self-contained relative to the original positioning equipment of the airplane, and is different in design. This imparts dissimilarity between the positioning unit 27 and the original positioning equipment of the airplane, thus serving in particular to ensure that a common mode failure does not lead to simultaneous outages both of the original positioning equipment of the airplane and of the positioning unit 27.

The control 28 is a flight control computer developed in compliance with a development assurance level A (DAL A)

The control unit 28 has two dissimilar calculation channels 28a and 28b. This serves to avoid a common mode failure leading to a simultaneous outage of both calculation channels 28a and 28b and thus of the control unit 28.

Each calculation channel 28a, 28b presents architecture of the COM/MON type and comprises a command module and a monitor module.

The control unit 28 is capable of piloting during stages of taxiing, of takeoff, of cruising, and of landing when the airplane is piloted by a single pilot.

The control unit 28 is thus arranged to produce an alternative piloting setpoint for the airplane.

This alternative piloting setpoint is used to pilot the airplane when the airplane is in an emergency situation forming part of a predefined list of emergency situations. The predefined list of emergency situations comprises any failure arising in the airplane, a failure of the autopilot system 6 of the airplane, a failure of the pilot of the airplane, a situation in which the airplane is going towards a predefined prohibited area, and a loss of communication with the ground station while the airplane is being piloted by a co-pilot on the ground who is present in a ground station.

In particular, the control unit 28 hosts emergency piloting relationships that are used in the event of the autopilot system of the airplane failing. The emergency piloting relationships serve to stabilize the airplane and to maintain its speed.

The control unit 28 also hosts fail-soft piloting relationships.

The fail-soft piloting relationships include a relationship for mitigating the pilot becoming unavailable while the airplane is taking off. By way of example, the pilot becoming unavailable could be the result of the pilot dying suddenly or becoming physically or psychologically incapacitated for any reason whatsoever during a flight.

While the airplane is taking off, if the pilot becomes unavailable, it is still possible to interrupt takeoff so long as the speed of the airplane is below a determined speed V1. Once the speed of the airplane exceeds the determined speed V1, takeoff can no longer be interrupted since it is too risky to use ground breaking of the airplane at high speed, and it is then imperative to make the airplane takeoff.

Between the moment when the airplane exceeds the determined speed V1 and the moment when the airplane exceeds a determined altitude, e.g. equal to 200 feet, it is normally the pilot who pilots the airplane in manual mode: The autopilot system 6 is not used during this particular stage.

Thus, when it is detected that the pilot is unavailable during this period, which lasts for several seconds, typically six seconds, it is the alternative piloting system 1 that takes over from the pilot and that manages takeoff. Thereafter, the autopilot system 6 takes over from the alternative piloting system 1.

In the event of the pilot being unavailable, the control unit 28 also hosts emergency flight plans. Thus, if the pilot is unavailable, the alternative piloting system 1 directs the airplane to an airport where it can land.

The control unit 28 may also produce the alternative piloting setpoint so as to avoid the airplane penetrating into predefined prohibited areas. The geographical coordinates of the predefined prohibited areas are stored in the control unit 28.

The alternative piloting setpoint serves to give the airplane a path that no longer leads to the airplane penetrating into predefined prohibited areas. By way of example, a predefined prohibited area is an area containing particular infrastructure (e.g. a nuclear power station), an area of high population density, etc.

The control unit 28 continuously calculates the future path of the airplane while making use of the positioning data produced by the positioning unit 27, and it estimates whether the future path interferes with a predefined prohibited area. In the event of the pilot going towards a predefined prohibited area, either because the pilot is unavailable, or else for the purpose of crashing the airplane deliberately, the alternative piloting setpoint produced by the alternative piloting system 1 is used to pilot the airplane and to prevent it from penetrating into the predefined prohibited area. If necessary, the alternative piloting setpoint causes the airplane to crash in an unpopulated area. This performs a "geofencing" function: the position of the airplane is monitored in real time, and if the airplane is going towards a predefined prohibited area, action is taken on its path to prevent the airplane from penetrating into the predefined prohibited area.

The control unit 28 thus makes use of relationships for guiding a controlled crash and also an algorithm for detecting the loss of the geofencing function.

The alternative piloting system 1 also includes an acquisition and analysis device 30 of the invention. The acquisition and analysis device 30 of the invention is connected to the main bus 25, and also to the flight control system 2, to the landing gear system 3, to the lighting system 4, to the communication system 5, and to the autopilot system 6, via secondary buses 31, which in this example are A429 buses.

The acquisition and analysis device 30 is a central and critical element of the alternative piloting system 1. The acquisition and analysis device 30 must therefore be robust against a single outage and against an erroneous command in order to avoid generating an event that gives rise to losing control of the airplane.

Figure 2:
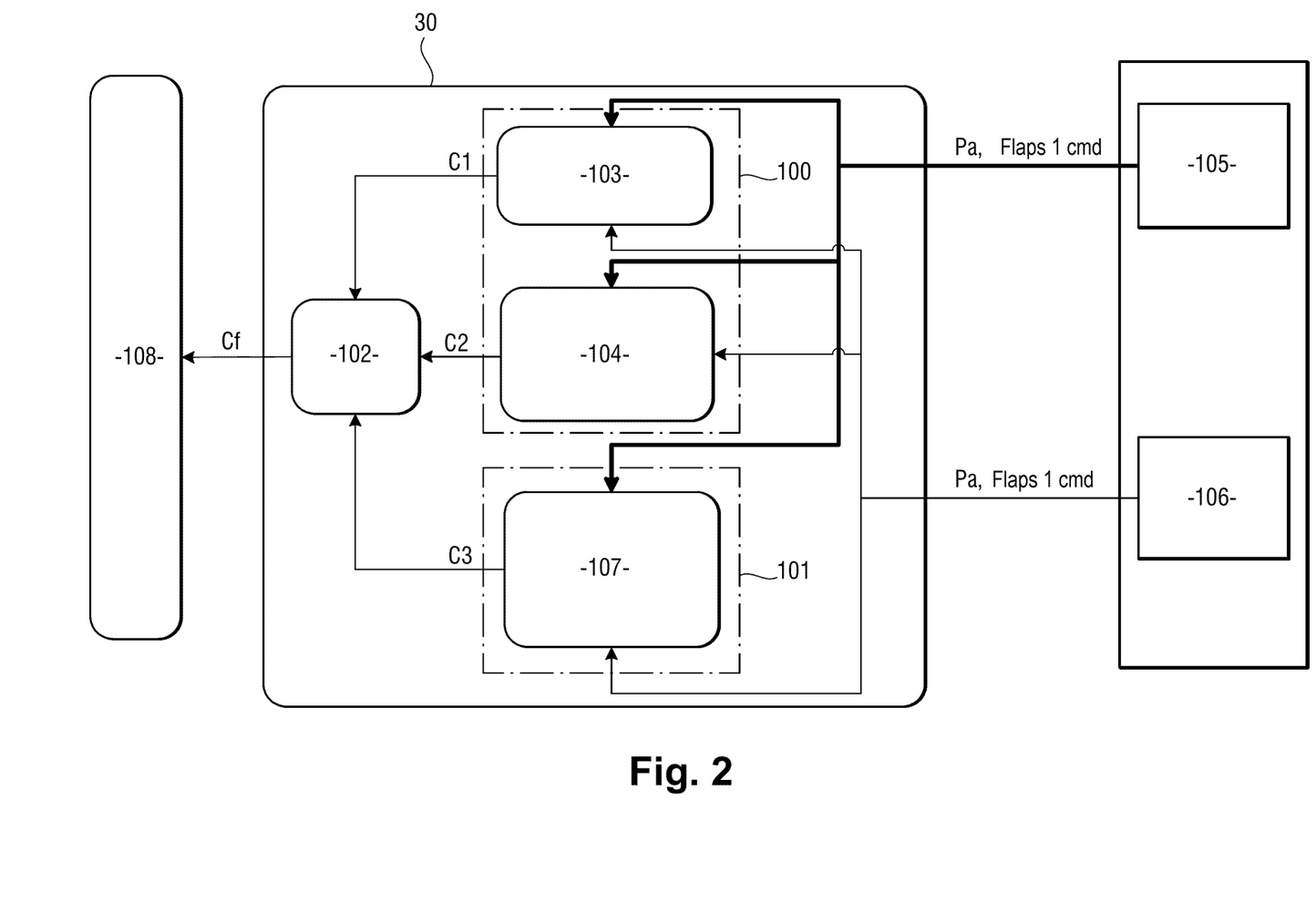
FIG. 2 shows the physical architecture of the acquisition and analysis device of the invention.

With reference to FIG. 2, there follows a description of the critical architecture of the acquisition and analysis device 30.

The acquisition and analysis device 30 comprises a first processor module 100, a second processor module 101, and a selection module 102.

The first processor module 100 comprises a first computer 103 and a second computer 104. The first and second computers 103 and 104 are identical both at hardware level and at software level. Each of the first and second computers 103 and 104 includes a respective first electrical circuit card on which the same first software is programmed. The first circuit cards comprise identical first electrical components, and in particular the same first processors.

Each of the first and second computers 103 and 104 presents COM/MON type architecture, each of them comprising a command module and a monitor module. In each of the first and second computers 103 and 104, the software of the monitor module monitors each command produced by the command module.

Each of the first and second computers 103 and 104 receives identical input data coming from two different sources.

For example, each of the first and second computers 103 and 104 receives a "Flaps 1" command as transmitted both by a first source 105 and by a second source 106, and it receives airplane parameters Pa as transmitted both by the first source 105 and by the second source 106. The airplane parameters Pa enable the first and second computers 103 and 104 to determine the current stage of flight of the airplane.

The second processor module 101 includes a third computer 107. The architecture of the third computer 107 is different from the architecture of the first and second computers 103 and 104. The third computer 107 is different both at hardware level and at software level. The third computer 107 has a second electrical circuit card that is different from the first circuit cards, and second software that is different from the first software is programmed thereon.

The second circuit card has second electrical components that are different from the first electrical components, and in particular it has a second processor that is different from the first processors.

The third computer 107 likewise presents architecture of the COM/MON type and comprises a command module and a monitor module. The software of the monitor module monitors each command produced by the command module.

The third computer 107 also receives identical input data coming both from the first source 105 and from the second source 106.

The selection module 102 is connected to the outputs of the first computer 103, of the second computer 104, and of the third computer 107. The selection module 102 acquires a first command C1 produced by the first computer 103, a second command C2 produced by the second computer 104, and a third command C3 produced by the third computer 107.

Then, as a function of the states of the first computer 103, of the second computer 104, and of the third computer 107, the selection module 102 selects a final command from among the first, second, and third commands C1, C2, and C3. The final command Cf is sent to the external systems 108.

It can thus be understood that, if one of the first, second, and third computers 103, 104, and 107 fails, then there remain two computers that are operational in order to take over from the failed computer. It can also be understood that the dissimilarity between the third computer 107 and each of the first and second computers 103 and 104 serves to avoid a common mode failure leading to simultaneous failure of the first processor module 100 and of the second processor module 101 and thus of the acquisition and analysis device 30.

This ensures continuous operation for the acquisition and analysis device 30 and thus for the alternative piloting system 1.

The acquisition and analysis device 30 of the invention includes acquisition means 32 and analysis means 33 (which are thus functional means implemented by the above-described physical architecture).

The acquisition means 32 include a plurality of interfaces with the original systems and a plurality of interfaces with the main bus 25.

The acquisition means 32 acquire parameters comprising data produced by the original systems of the airplane together with the alternative positioning data and the piloting setpoint produced by the piloting device 26.

The data produced by the original systems of the airplane and acquired by the acquisition means 32 comprises airplane position data, attitude data, parameters produced by the autopilot system 6, parameters produced by the flight control system 2, engine parameters, navigation data, failure data, etc.

The analysis means 33 of the acquisition and analysis device 30 process and analyze all of these parameters. The analysis means 33 detect inconsistencies, if any, among these parameters.

The analysis means 33 process the parameters (by sorting, formatting, etc.) in order to transform them into airplane parameters suitable for being transmitted to the remainder of the alternative piloting system 1, to the ground, etc.

The analysis means 33 also host state machines that serve to support the pilot (cross checks, additional pilot actions), and also to trigger emergency procedures or indeed to allow commands issued by the piloting device 26 to be taken into account. These state machines are described in greater detail below.

On the basis of all this data, on the basis of the alternative piloting setpoint, and on the basis of the results of its own processing and analyses, the acquisition and analysis device 30 decides whether or not the alternative piloting setpoint should be used for piloting the airplane.

A first example of analysis is mentioned above in this description. While the airplane is taking off, there is a short period during which the airplane is normally piloted manually by the pilot. If it is detected that the pilot is unavailable, the analysis means 33 of the acquisition and analysis device 30 decide that the alternative piloting setpoint produced by the alternative piloting system 1 should be used for piloting the aircraft. Thereafter, following this short period, the analysis means 33 of the acquisition and analysis device 30 decide that the alternative piloting setpoint should no longer be used for piloting the airplane. The autopilot system 6 thus takes over from the alternative piloting system 1 in order to land the airplane safely.

A second example of selecting the priority setpoint is as follows.

If a manual piloting setpoint as produced by the pilot is tending to direct the aircraft towards a predefined prohibited area, the analysis means of the acquisition and analysis device 30 decide that the alternative piloting setpoint produced by the alternative piloting system 1 is to be used to pilot the airplane. The airplane then performs a maneuver enabling it to avoid penetrating into the prohibited area.

Thereafter, following this maneuver, the analysis means 33 decide that the alternative piloting setpoint should no longer be used for piloting the airplane: the acquisition and analysis device 30 returns control to the autopilot system 6 after the alternative piloting system 1 has performed the maneuver.

A third example of selecting the priority setpoint is as follows.

By analyzing airplane parameters (example analyzing engine setpoints and flight control surface setpoints), the acquisition and analysis device 30 is also capable of detecting a failure situation having an impact on the airplane. If the airplane is being piloted by the autopilot system 6 and if the failure is likely to have an impact on the autopilot system 6, the acquisition and analysis device 30 decides that the alternative piloting setpoint should be used for piloting the airplane and engages an emergency piloting mode.

The alternative piloting system 1 also includes an interface device 34 comprising two redundant interface units 34a and 34b.

The interface device 34 is connected to the main bus 25, and also to the flight control system 2, to the landing gear system 3, to the lighting system 4, to the communication system 5, and to the autopilot system 6, via secondary buses 35, which in this example are A429 buses.

The interface device 34 includes switch means comprising a relay system of very high integrity.

The relays are controlled by the analysis means 33 of the acquisition and analysis device 30. When the analysis means 33 decide that the alternative piloting setpoint is to be used for piloting the airplane, the analysis means 33 control the relays so that they connect an output of the piloting device 26 to the flight control system 2.

The interface device 34 thus applies the alternative piloting setpoint as produced by the piloting device 26 when the acquisition and analysis device 30 decides that that is the setpoint that is to be used.

The interface device 34 provides the physical interface for activating airplane controls and it emulates the airplane controls: flight controls, landing gear, flaps, circuit breakers, etc. . . . The alternative piloting system 1 further includes a communication device 37 that comprises a secure data module (SDM) 38, an air data terminal (ADT) module 39, and a C2link module 40.

These modules form interface means interfacing with a remote piloting system, communication means communicating with remote control, and data security means serving to ensure the integrity of recorded information. Integrity relies in particular on making both the recorded data and the commands secure by using the principles implemented in a safety checker.

The communication device 37 is connected to the main bus 25 via the ADT module 39, and also to the communication system 5 via secondary buses 41, which in this example are A429 buses. The communication device 37 is connected to the acquisition and analysis device 30 by a serial link.

The communication device 37 enables the airplane to be remotely controlled. In particular, the communication device 37 serves to establish communication with the ground, so that the alternative piloting system 1 can be controlled from the ground. Thus, by way of example, in the event of the pilot being unavailable, radio communication and control of the airplane flight path can be managed from the ground.

The communications performed by the communication device 37 between the airplane and the ground may take place over direct (line of sight) radio links, over satellite links, or indeed using ground radio communication infrastructure (e.g. 4G or 5G type mobile telephone networks).

The alternative piloting system 1 also includes a taxiing control device 45 that comprises a taxi assistance system (TAS) module 46, a guide device 47 capable of using one or more cameras and of performing image processing, and an anti-collision device 48, e.g. making use of radar and potentially also of a camera imaging device (daylight, long wavelength infrared (LWIR)).

The taxiing control device 45 is connected externally to the main bus 25.

The taxiing control device 45 is suitable for producing a piloting setpoint for the airplane on the ground. The taxiing control device 45 is suitable for braking the airplane in the event of the pilot being incapacitated before the airplane reaches the determined speed V1 during takeoff (as explained above in this description), and also serves to remain on the axis of the runway under such conditions. The taxiing control device can also perform taxiing, taking the place of the pilot.

The alternative piloting system 1 also has a power supply device 49 including an uninterruptible power supply. The power supply device 49 is a self-contained and independent device that powers the alternative piloting system 1 even in the event of a failure having an impact on the power generation systems of the airplane. The power supply device 49 is connected to the other devices of the alternative piloting device 1 by independent power buses.

The alternative piloting system 1 also includes a system monitoring device 50 for monitoring the airplane.

The airplane system monitoring device 50 includes a screen located in the cockpit.

The airplane monitoring device 50 is connected to the main bus 25.

The alternative piloting system 1 also includes a pilot monitoring device 51. The pilot monitoring device 51 is used for detecting that the airplane is in the emergency situation corresponding to the pilot being unavailable.

The pilot monitoring device 51 includes a camera for acquiring images of the pilot's face, and in particular of the pilot's eyes.

The pilot monitoring device 51 also includes a detector system that uses biometric sensors and specific sensors, and that is capable, in less than two seconds, of detecting that the pilot is incapacitated. The detection system requests the pilot to perform a continuous and deliberate action during the critical stage of takeoff. The specific sensors used by the detection system for this purpose may be pushbuttons that are arranged on the control stick and the throttle lever, and that need to be pressed during takeoff, or indeed they may be optical sensors that serve to verify that the pilot's hands are indeed on the controls.

The pilot monitoring device 51 is connected to the main bus 25.

The alternative piloting system 1 also includes a virtual co-pilot device 52. The purpose of the virtual co-pilot device 52 is to anticipate risky situations and to warn the pilot in the event of such situations becoming likely to occur. Also (and above all) the virtual co-pilot device 52 has the purpose of making cross checks between the data and critical actions, and also of performing tasks in automatic manner. It also has a voice interface with the pilot, and a visual interface. It also generates audio messages. It is made up of a state machine portion, of a processor module, and of a man machine interface (MMI) portion.

The virtual co-pilot device 52 is connected to the main bus 25.

Figure 3:
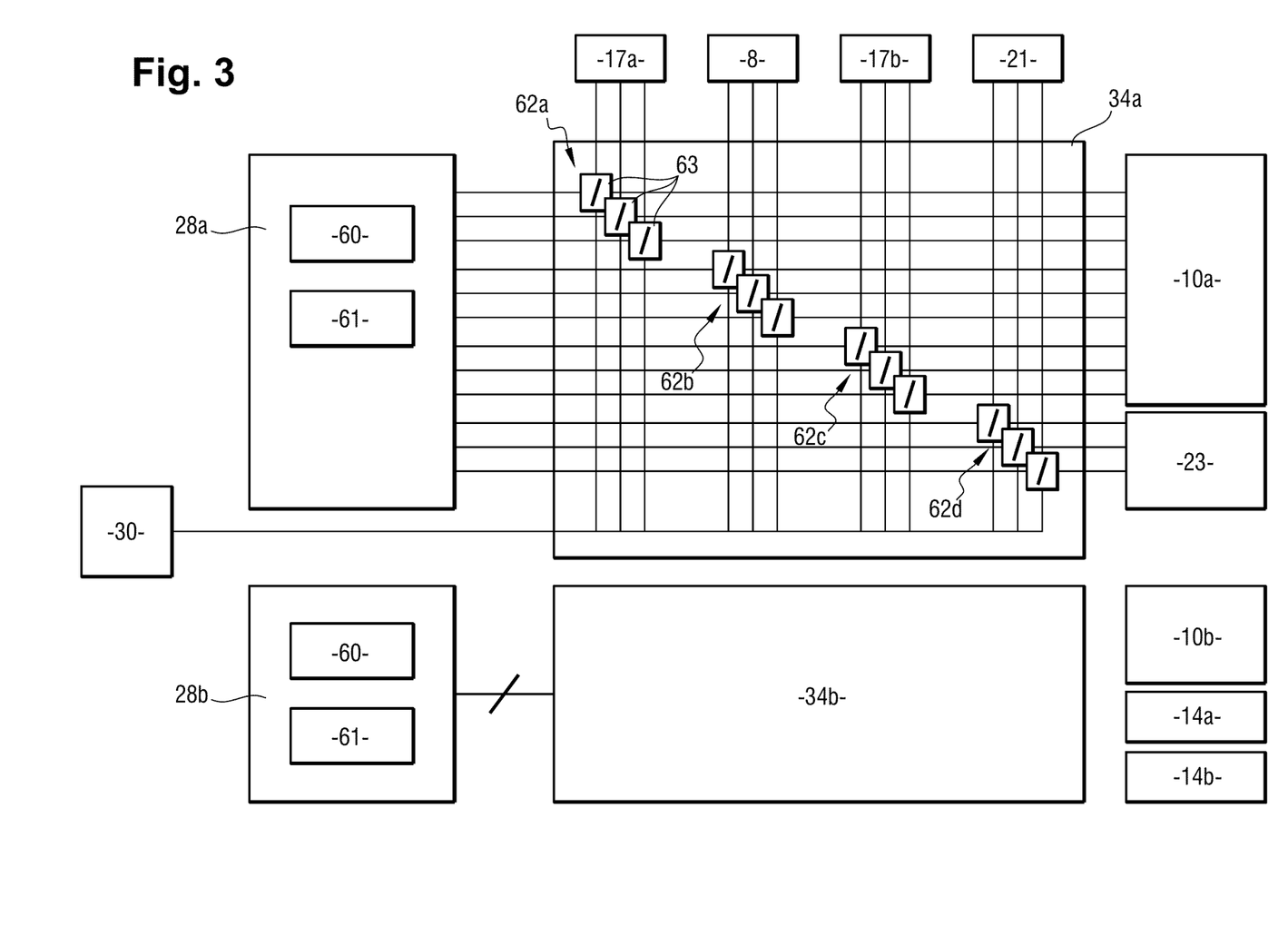
FIG. 3 shows a piloting device, the acquisition and analysis device of the invention, and an interface device forming part of the alternative piloting system, together with pilot controls and computers forming part of the original system.

The operation of the piloting device 26, of the acquisition and analysis device 30, and of the interface device 34 are described below with reference to FIGS. 3 and 4.

As mentioned above, and with reference to FIG. 3, the control unit 28 of the piloting device 26 has two calculation channels 28a and 28b, each of which comprises a command module 60 and a monitor module 61.

Outputs from the calculation channels 28a are connected to inputs of the interface unit 34a. Outputs from the calculation channels 28b are connected to inputs of the interface unit 34b.

The first control stick 17a, the second control stick 17b, pedals 8, and a throttle 21 are connected to inputs of each of the interface units 34a and 34b.

Outputs from the interface unit 34a are connected to inputs of a first ELAC computer 10a and of a FADEC computer 23. Outputs of the interface unit 34b are connected to inputs of a second ELAC computer 10b, of a first THS computer 14a, and of a second THS computer 14b.

The interface unit 34a has four sets of relays 62a, 62b, 62c, and 62d, each of which comprises three distinct relays 63.

Three analog outputs of the calculation channel 28a are connected to first inputs of respective distinct relays 63 belonging to the first relay set 62a. Three analog outputs of the first control stick 17a are connected to second inputs of respective distinct relays 63 belonging to the first relay set 62a. The outputs of the three relays 63 of the first relay set 62a are connected to the first ELAC computer 10a.

Three analog outputs of the calculation channel 28a are connected to first inputs of respective distinct relays 63 belonging to the second relay set 62b. Three analog outputs of the pedals 8 are connected to second inputs of respective distinct relays 63 belonging to the second relay set 62b. The outputs of the three relays 63 of the second relay set 62b are connected to the first ELAC computer 10a.

Three analog outputs of the calculation channel 28a are connected to first inputs of respective distinct relays 63 belonging to the third relay set 62c. Three analog outputs of the second control stick 17b are connected to second inputs of respective distinct relays 63 belonging to the third relay set 62c. The outputs of the three relays 63 of the third relay set 62c are connected to the first ELAC computer 10a.

Three analog outputs of the calculation channel 28a are connected to first inputs of respective distinct relays 63 belonging to the fourth relay set 62d. Three analog outputs of the throttle 21 are connected to second inputs of respective distinct relays 63 belonging to the fourth relay set 62d. The outputs of the three relays 63 of the fourth relay set 62d are connected to the FADEC computer 23.

The acquisition and analysis device 30 is connected to third inputs of each of the relays 63. The third input of a relay 63 serves to control the relay 63 so as to switch a selected one of its first and second inputs to the output of said relay 63.

The calculation channel 28b, the interface unit 34b, the acquisition and analysis device 30, the second ELAC computer 10b, the first THS computer 14a, and the second THS computer 14b are connected together in similar manner.

When the analysis means 33 of the acquisition and analysis device 30 decide that the alternative piloting setpoint is to be used for piloting the airplane, the analysis means 33 produce a switching command that causes the first input of each of the relays 63 to be switched to the output of said relay 63: the computers 10a, 10b, 14a, 14b, and 23 are then indeed controlled by the alternative piloting setpoint.

In contrast, when the analysis means 33 of the acquisition and analysis device 30 decide that the alternative piloting setpoint is not to be used for piloting the airplane, the analysis means 33 produce a relay command that switches the second input of each of the relays 63 to the output of said relay 63: the computers 10a, 10b, 14a, 14b, and 23 are then piloted by the manual piloting setpoint as produced by the pilot acting on the pilot controls in the cockpit.

Figure 4:
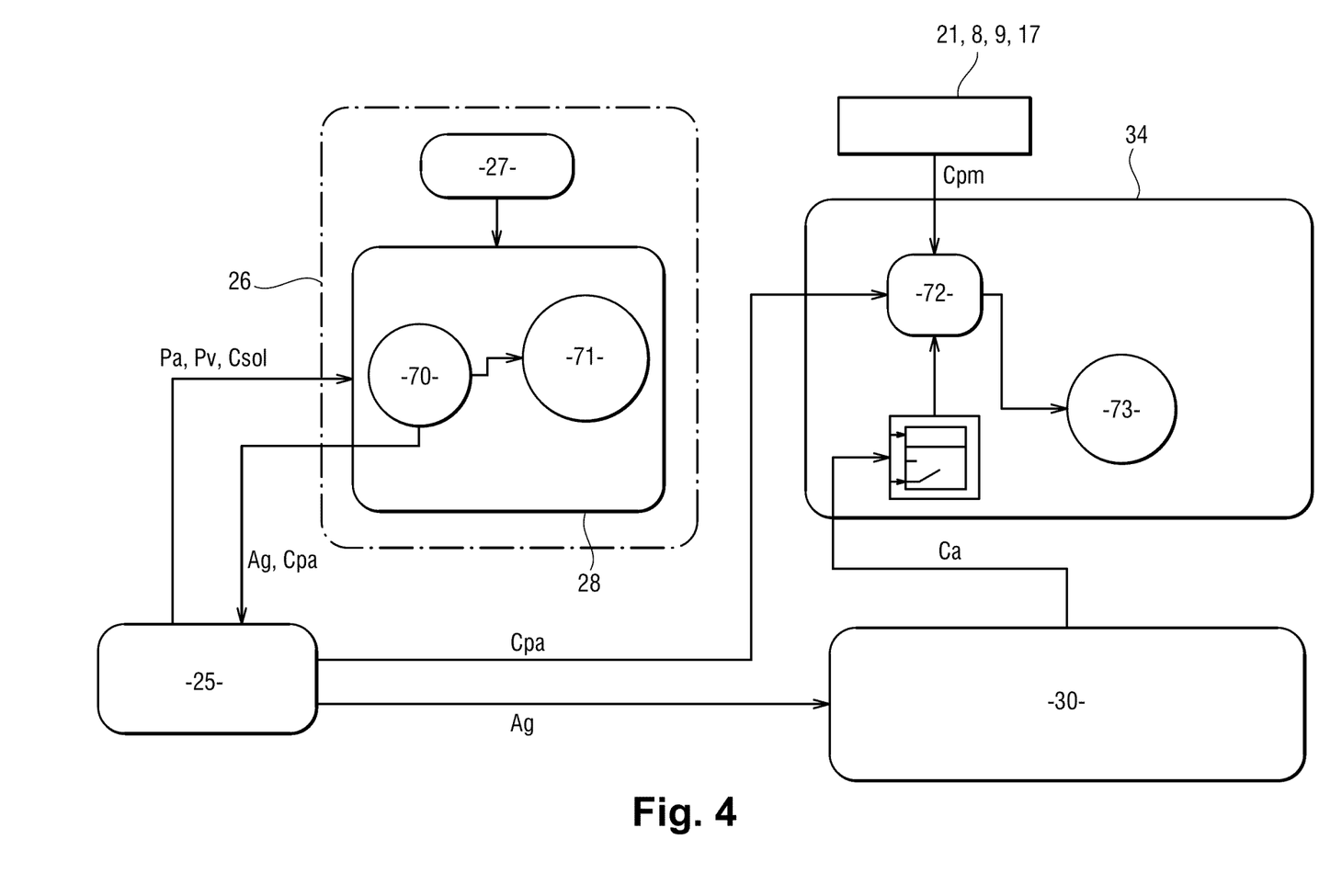
FIG. 4 shows the piloting device, the acquisition and analysis device of the invention, the interface device, and a main bus.

With reference to FIG. 4, it can be seen that the control unit 28 of the piloting device 26 (which also includes the positioning unit 27), the acquisition and analysis device 30, and the interface device 34 are all connected to the main bus 25.

From the main bus 25, the control unit 28 acquires airplane parameters Pa, ground commands Csol produced by the ground station, and the current stage of flight Pv of the airplane. The control unit 28 performs a geofencing function 70. If the airplane is going towards a predefined prohibited area, the control unit 28 issues a geofencing alert Ag on the main bus 25 together with an alternative piloting setpoint Cpa seeking to avoid the airplane penetrating into said predefined prohibited area.

The control unit 28 performs a piloting function 71 to produce an alternative piloting setpoint, e.g. serving to finalize a takeoff and to stabilize the airplane after takeoff.

The acquisition and analysis device 30 receives the geofencing alert Ag and the interface device 34 receives the alternative piloting setpoint Cpa. The interface device 34 performs an acquisition function 72 to acquire the alternative piloting setpoint Cpa together with the manual piloting setpoint Cpm as generated by the pilot acting on the pilot controls 21, 8, 9, and 17.

The acquisition and analysis device 30 produces a switching command Ca to control the relays of the interface device 34 to inhibit the manual piloting setpoint Cpm as generated by the pilot and to activate the alternative piloting setpoint Cpa. The interface device 34 performs a conversion function 73 that transforms the alternative piloting setpoint Cpa into a setpoint serving to control the flight control computers and to control the engines so as to pilot the airplane and avoid it penetrating into predefined prohibited areas.

Figure 5:
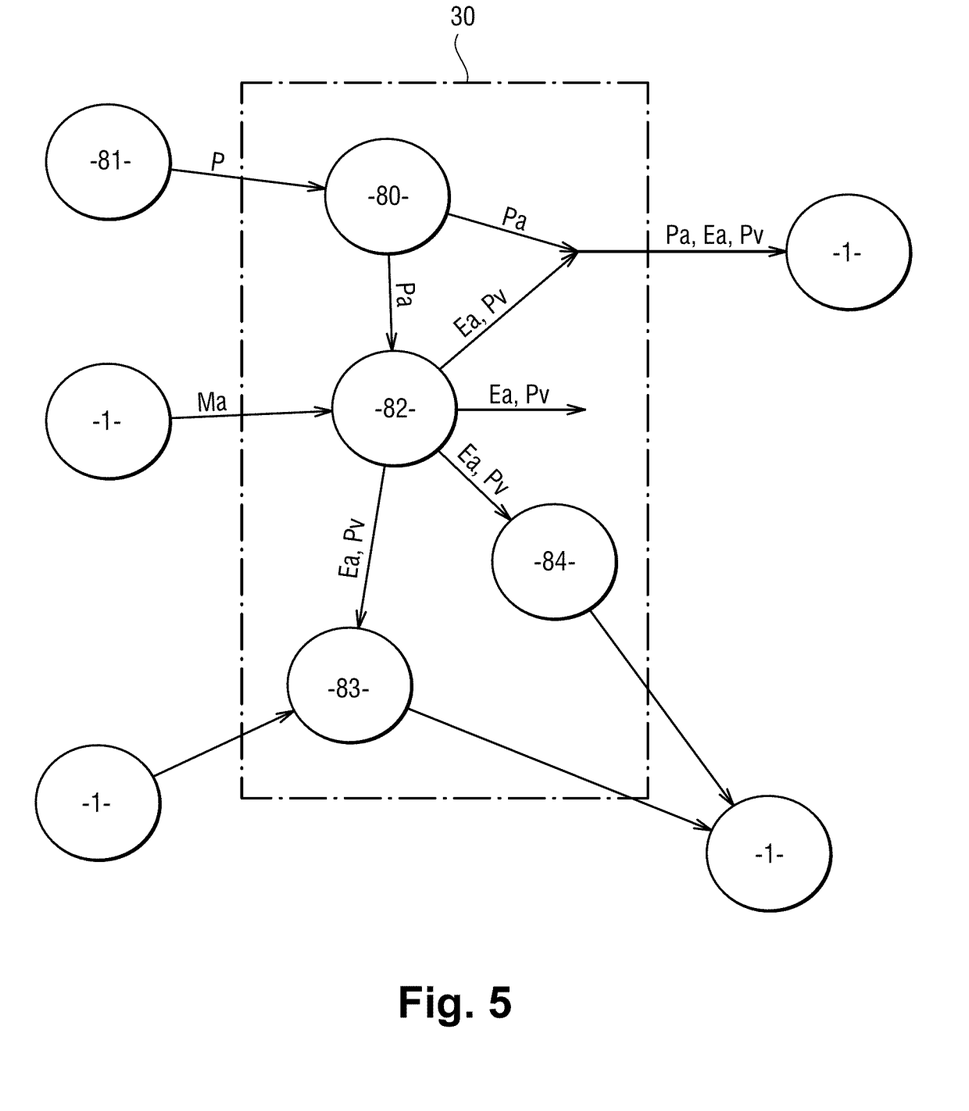
FIG. 5 shows functions performed by the acquisition and analysis device of the invention.

With reference to FIG. 5, there follows a more detailed description of the operation of the acquisition and analysis device 30.

The acquisition means 32 of the acquisition and analysis device 30 begin by performing an acquisition function 80. The acquisition function 80 uses the secondary buses (which in this example are A429 buses) to acquire the parameters P as produced by the original systems 81 of the airplane.

On the basis of the parameters P, the acquisition function 80 produces airplane parameters Pa, and it transmits the airplane parameters Pa over the main bus 25 to the other devices of the alternative piloting system 1.

The analysis means 33 of the acquisition and analysis device 30 perform an evaluation function 82 in order to evaluate the state Ea of the airplane and its current stage of flight Pv.

The evaluation function 82 acquires the airplane parameters Pa together with any alert messages Ma produced by the other devices of the alternative piloting system 1, in particular by the piloting device 26, the airplane monitoring device 50, and the pilot monitoring device 51. The evaluation function 82 evaluates the state Ea of the airplane and its current stage of flight Pv from this data.

Thus, the evaluation function 82 acquires the state of the pilot (operational or not operational), monitors the states of the various ARINC 429 buses of the avionics, and acquires the airplane parameters Pa. The evaluation function 82 analyzes this data in order to estimate the state of the airplane, which state may be normal or abnormal.

The evaluation function 82 defines the current stage of flight Pv of the airplane as a function of the airplane parameters Pa. The current stage of flight is then used for managing modes and commands. It serves to activate the corresponding state machine, i.e. to run the procedures and the actions that are to be performed during the current stage of flight (e.g. causing the landing gear to be retracted after takeoff, causing alerts to be sent to the pilot, etc.).

The evaluation function 82 transmits the state of the airplane and its current stage of flight to the ground station and to the devices of the alternative piloting system 1.

The analysis means 33 of the acquisition and analysis device 30 also perform a management function 83.

The management function 83 acquires the state Ea of the airplane and its current stage of flight Pv, together with ground commands as produced by the co-pilot on the ground from the ground station.

The management function 83 executes a first state machine serving to define the airplane mode in which the airplane is currently to be found. The airplane mode may be nominal or else degraded. The airplane mode serves to determine who or what is piloting the airplane: the on-board pilot, the co-pilot on the ground, the original autopilot system, or else the alternative piloting system.

On the basis of the state and the current stage of flight of the airplane, the management function 83 thus defines a piloting setpoint selected from among a plurality of piloting setpoints comprising the manual piloting setpoint as produced by the on-board pilot using the pilot controls, a ground piloting setpoint as produced by the co-pilot on the ground, an autopilot setpoint as produced by the autopilot system, and the alternative piloting setpoint.

Depending on the airplane mode, the management function 83 generates the flight plan modification command, which command is defined either by the on-board pilot or else by the pilot on the ground. The management function manages switching of which flight path is to be followed as defined either by the on-board pilot, or by the co-pilot on the ground, or by the original autopilot system, or by the alternative piloting system.

The management function 83 thus causes the selected piloting setpoint to be transmitted to the original systems of the pre-existing aircraft so as to control the original systems using the selected piloting setpoint. The management function 83 is arranged to produce a switching command for controlling one or more relays of the interface device 34 so as to cause the selected piloting setpoint to be transmitted to the original systems.

The management function 83 also manages automatic activation of commands produced by the pilot(s) or by the co-pilot(s), in nominal mode or in degraded mode. By way of example, these commands may serve to control landing gear or spoilers.

To do this, the management function 83 decodes the commands received from the ground station or from the virtual co-pilot. Depending on the airplane mode, the management function 83 manages priorities from among the requests received from various sources, and it sequences detailed commands to the interface device 34.

The analysis means 33 of the acquisition and analysis device 30 also perform an execution function 84. The analysis means 33 host a second state machine for executing commands produced by the virtual co-pilot.

The second state machine selects and executes airplane procedures as a function of data received by the virtual co-pilot.

The virtual co-pilot receives voice commands and transforms the voice commands into text. The virtual co-pilot transmits these commands to the execution function 84.

The execution function 84 transforms these high-level commands into a programmed sequence of actions. The execution function executes the programmed sequence of actions over time.

Depending on the state of the airplane during the sequence (which state might vary during the sequence), the execution function 84 takes the appropriate decisions in order to guarantee that the procedure progresses properly with respect to the initial command. The execution function 84 returns to the virtual co-pilot acknowledgements of proper progress and/or the precautionary actions performed and the anomalies detected during execution.

In particular, the execution function 84 transforms information into the proper format and then transmits it to the virtual co-pilot so as to enable the information to be interpreted by the virtual co-pilot and then relayed to the pilot.

The operation of the acquisition and analysis device 30 and of the virtual co-pilot are described below with reference to FIGS. 6 and 7.

Figure 6:
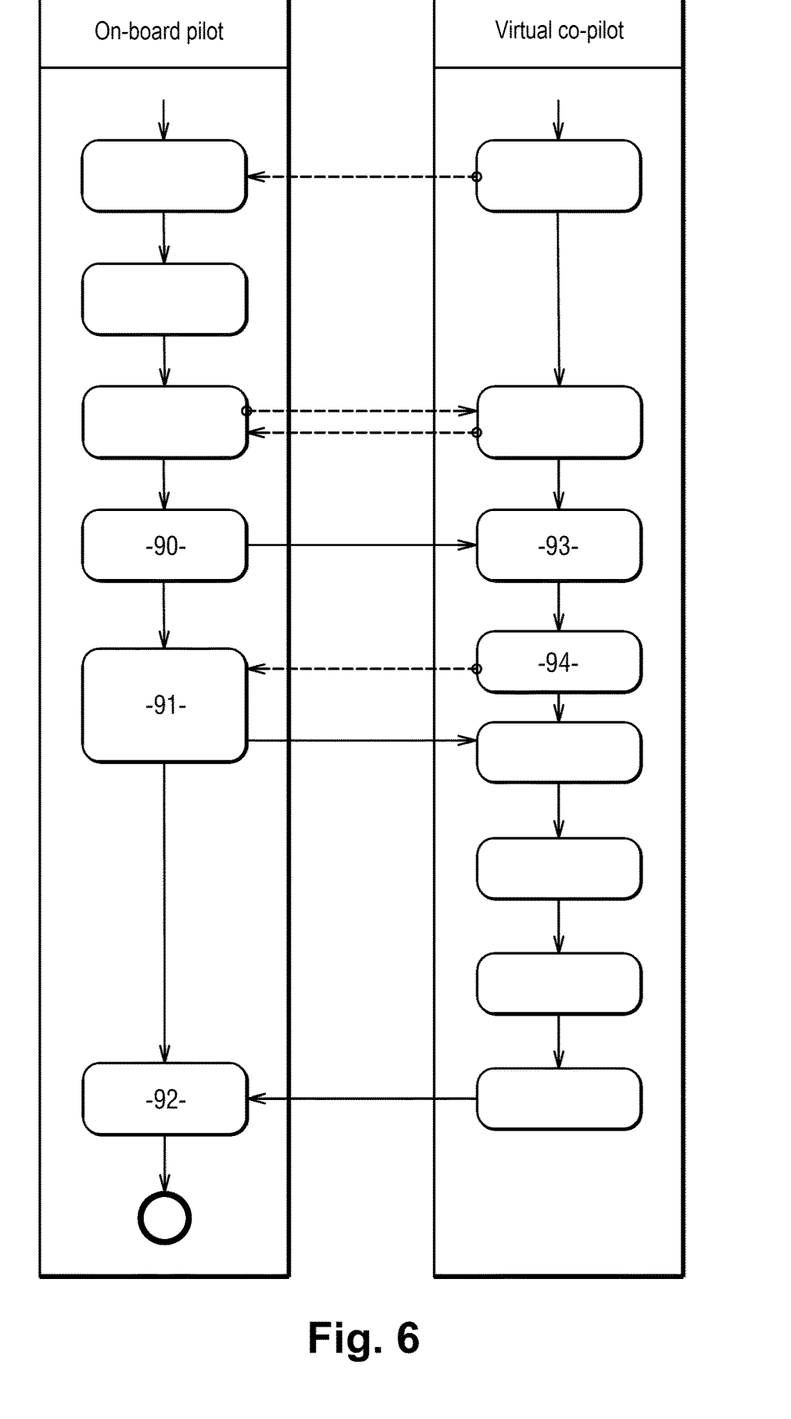
FIG. 6 shows sequences of actions performed during a takeoff by an on-board pilot and by a virtual co-pilot.

With reference to FIG. 6, a normal takeoff requires the on-board pilot to perform a sequence of actions.

At the end of the normal takeoff, the pilot thus produces a Flaps 1 command (action 90) by acting on the flight controls to put the high-lift devices (slats and flaps) into the Flaps 1 configuration. Thereafter, the pilot produces a Flaps 0 command (action 91) to put the high-lift devices into the Flaps 0 configuration. Thereafter, the pilot selects the climb speed for the airplane (action 92).

The virtual co-pilot performs a sequence of preprogrammed actions in association with the sequence of pilot actions. Following the Flaps 1 command, the virtual co-pilot announces the phrase "speed checked" in the cockpit (action 93), and then selects the Flaps 1 configuration (action 94).

Figure 7:
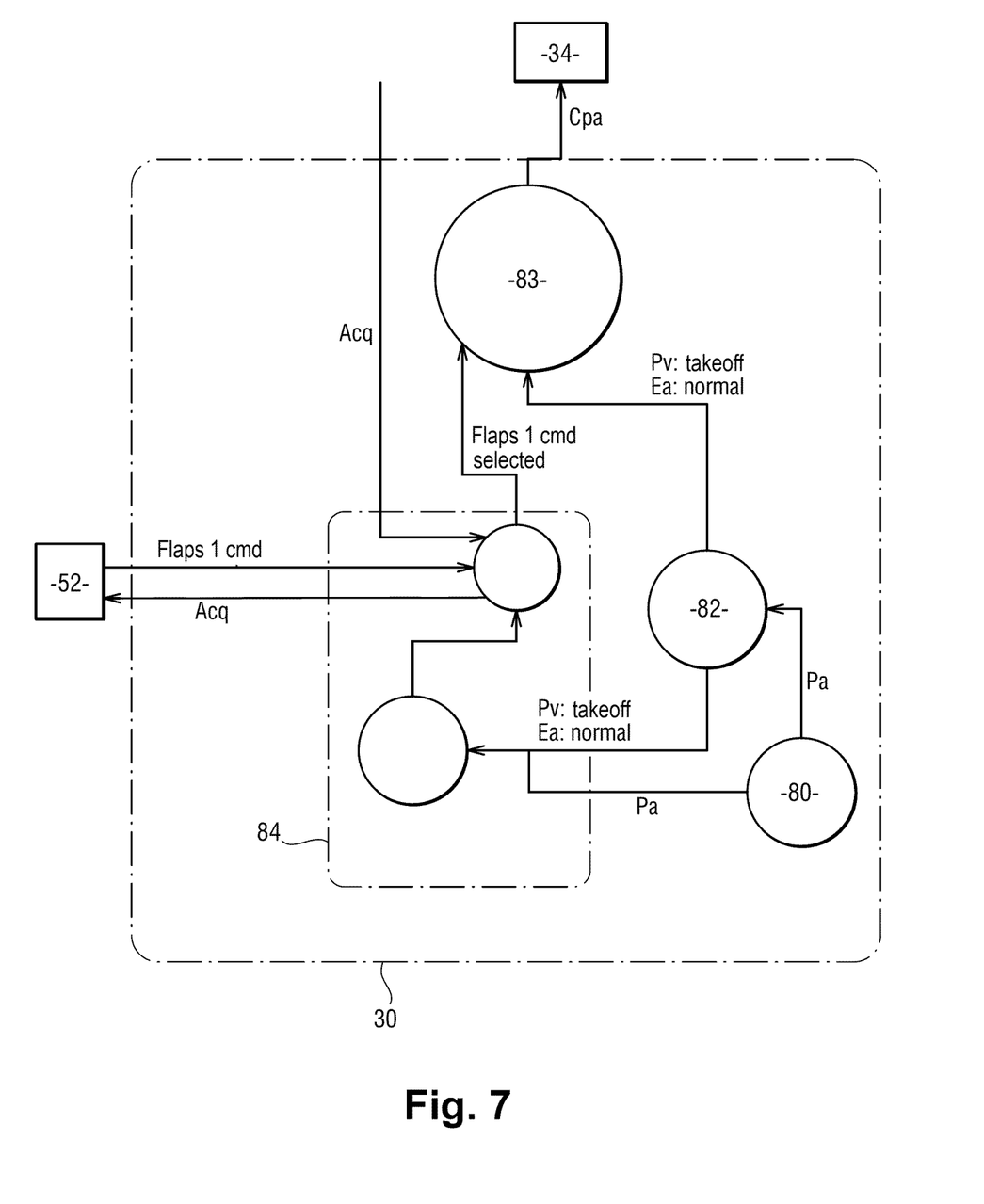
FIG. 7 shows the operation of the acquisition and analysis device of the invention while performing the sequences of actions of FIG. 6.

In FIG. 7, there can be seen the operation of the acquisition and analysis device 30 during these sequences of actions.

The second state machine of the execution function 84, as performed by the analysis means 33 of the acquisition and analysis device 30, receives the Flaps 1 command from the virtual co-pilot 52.

In parallel, the acquisition function 80 transmits the airplane parameters Pa to the evaluation function 82 and to the second state machine of the execution function 84.

The evaluation function 82 determines the state Ea of the airplane and its current stage of flight Pv. Specifically, the state of the airplane is normal and the current stage of flight is the takeoff stage. The evaluation function 82 transmits this information to the second state machine of the execution function 84 and to the management function 83.

The second state machine selects the procedure corresponding to the state of the airplane and to its current stage of flight, and then executes the programmed sequence of actions corresponding to the Flaps 1 command.

Specifically, the second state machine transmits the selected Flaps 1 command to the management function 83, which decides that the alternative piloting setpoint produced by the alternative piloting system 1 is to be used. The management function 83 sends a switching command Ca to the interface device 34 so that the corresponding switching is performed.

Once the Flaps 1 command has been executed correctly and the high-lift devices have been activated in compliance with this command, the second state machine receives acknowledgement Acq that this command has progressed properly and transmits the acknowledgement Acq to the virtual co-pilot 52.

Naturally, the invention is not limited to the embodiment described, but covers any variant coming within the ambit of the invention as defined by the claims.

The invention is applicable to any type of aircraft, and in particular to aircraft in which there might be only one pilot, or indeed to aircraft that do not have a pilot: a cargo plane piloted by a single pilot, a passenger plane piloted by a single pilot, a cargo drone (no pilot), a logistics drone, an urban taxi (piloted or a drone), etc.

The invention claimed is:

1. An acquisition and analysis device arranged to be integrated in a pre-existing aircraft that comprises original systems comprising both pilot controls suitable for being actuated by a pilot of the pre-existing aircraft and also an autopilot system, the acquisition and analysis device comprising at least one computer that is configured to:
   acquire parameters produced by the original systems of the pre-existing aircraft;
   on the basis of the parameters, evaluate whether the pre-existing aircraft is in a state that is normal or abnormal, and to evaluate the current stage of flight of the pre-existing aircraft;
   on the basis of the state of the pre-existing aircraft and of the current stage of flight of the pre-existing aircraft, define a piloting setpoint selected from among a plurality of piloting setpoints comprising at least a manual piloting setpoint produced by the pilot actuating the pilot controls, an autopilot setpoint produced by the autopilot system, and an alternative piloting setpoint produced by an alternative piloting system integrated in the pre-existing aircraft; and cause the selected piloting setpoint to be transmitted to the original systems of the pre-existing aircraft so that the original systems are controlled using the selected piloting setpoint.

2. The acquisition and analysis device according to claim 1, wherein the at least one computer is further configured to implement a first state machine in order to define the selected piloting setpoint.

3. The acquisition and analysis device according to claim 1, wherein the plurality of piloting setpoints also comprises a ground piloting setpoint produced by a co-pilot on the ground.

4. The acquisition and analysis device according to claim 1, wherein the at least one computer is further configured to produce a switching command for controlling one or more relays for causing the selected piloting setpoint to be transmitted to the original systems of the pre-existing aircraft.

5. The acquisition and analysis device according to claim 1, wherein the at least one computer is further configured to implement a second state machine in order to execute commands produced by a virtual co-pilot.

6. The acquisition and analysis device according to claim 1, comprising a first processor module, a second processor module, and a selection module, the first processor module comprising a first computer and a second computer, the second processor module comprising a third computer, the first computer and the second computer comprising respective first electric circuit cards and first software that are the same, the third computer comprising a second electric circuit card that is different from the first electric circuit card and second software that is different from the first software, the selection module being connected to outputs of the first computer, of the second computer, and of the third computer, and being arranged to act, as a function of the state of the first computer, of the state of the second computer, and of the state of the third computer, to select a final command from among a first command produced by the first computer, a second command produced by the second computer, and a third command produced by the third computer.

7. The acquisition and analysis device according to claim 6, wherein each of the first, second, and third computers presents architecture of the COM/MON type.

8. A pre-existing aircraft including original systems comprising both pilot controls suitable for being actuated by a pilot of the pre-existing aircraft and also an autopilot system, the pre-existing aircraft further comprising the acquisition and analysis device according to claim 1.

* * * * *